United States Patent
McNeill

[11] Patent Number: 5,236,484
[45] Date of Patent: Aug. 17, 1993

[54] METHOD OF FIRING GLASS-MELTING FURNACE

[76] Inventor: Keith R. McNeill, 153 Standon Road, Sheffield, South Yorkshire S9 1PG, United Kingdom

[21] Appl. No.: 793,358
[22] PCT Filed: May 9, 1990
[86] PCT No.: PCT/GB90/00716
§ 371 Date: Jan. 10, 1992
§ 102(e) Date: Jan. 10, 1992
[87] PCT Pub. No.: WO90/13522
PCT Pub. Date: Nov. 15, 1990

[30] Foreign Application Priority Data
May 10, 1989 [GB] United Kingdom ............... 8910766

[51] Int. Cl.$^5$ ............................................. C03B 3/02
[52] U.S. Cl. ................................. 65/27; 65/135; 65/335
[58] Field of Search ............ 65/27, 134, 135, 136, 65/335, 347; 432/159, 161, 186, 239, 245

[56] References Cited
U.S. PATENT DOCUMENTS

| | | |
|---|---|---|
| 2,455,907 | 12/1948 | Slayter .................................. 65/335 |
| 3,337,324 | 8/1967 | Cable et al. |
| 3,563,722 | 2/1971 | Troyankin ............................. 65/135 |
| 3,748,113 | 7/1973 | Ito . |
| 4,539,035 | 9/1985 | Burckhardt et al. ................. 65/136 |
| 4,617,042 | 10/1986 | Stickler . |
| 4,617,046 | 10/1986 | Hals . |
| 4,752,314 | 6/1988 | Fassbender et al. ................. 65/134 |

FOREIGN PATENT DOCUMENTS 270199  11/1950  Switzerland .

*Primary Examiner*—Joye L. Woodard
*Attorney, Agent, or Firm*—Cushman, Darby & Cushman

[57] ABSTRACT

A method of feeding and firing a glass-melting furnace comprises the step of passing glass batch, combustion air and burning fuel vertically down a cylindrical tower and through the crown of the furnace. A feed stream of glass batch and combustion air is surrounded by burning fuel in the tower and the flame of burning fuel strikes the surface of molten glass in the furnace. Infra-sound waves are applied to the glass batch, combustion air and burning fuel as these are fed downwardly through the tower and the crown of the furnace to enhance transfer of heat from the burning fuel to the glass batch so that the batch in the feed stream is heated to melting temperature and molten glass droplets fall upon the surface of molten glass in the furnace.

6 Claims, 3 Drawing Sheets

METHOD OF FIRING GLASS-MELTING FURNACE

FIELD OF THE INVENTION

This invention relates to a method of firing a glass-melting furnace and more particularly to such a method in which the batch materials and the firing flame are delivered vertically into the furnace.

SUMMARY OF THE INVENTION

In accordance with the present invention there is provided a method of feeding and firing a glass-melting furnace in which a feed stream comprising glass batch and combustion air is moved downwardly above the crown of the furnace, characterized in that the downwardly moving feed stream is surrounded by downwardly moving burning fuel, the feed stream and burning fuel are confined in a cylinder prior to entry into the furnace through the furnace crown, the batch in the feed stream is heated to melting temperature, and molten glass droplets fall upon the surface of molten glass in the furnace.

According to another feature of the present invention there is provided a method of feeding and firing a glass-melting furnace in which a feed stream comprising glass batch and combustion air is passed downwardly through a tower above the crown of the furnace, characterised in that fuel is introduced and burned in the tower to heat the glass batch, infra-sound waves are also applied within the tower to enhance transfer of heat from the burning fuel to the glass batch, and a mixture of heated glass batch, combustion air and burning fuel is passed downwardly from the tower through the crown of the furnace.

In a method of feeding and firing a glass-melting furnace in accordance with the present invention the glass batch, combustion air and burning fuel are passed vertically downwardly through the crown of the furnace, and the flame of burning fuel strikes the surface of molten glass in the furnace.

In one embodiment of the invention the glass-melting furnace was constructed with a suspended crown which had at its center a cylinder with a lid. The lid had a central hole and was surrounded by a ring of six holes, the centers of which were all equally spaced from the center of the central hole. The glass batch together with the secondary air was passed through the central hole and fossil fuel (gas or oil) passed via burners through the six holes making up the surrounding ring.

The glass-melting furnace which was fed in this way was a round furnace of about seven square meters area. The furnace was fed via a batch flow bin system and the furnace had a forehearth.

The waste gas was split into two streams, which left the furnace via two exits directly opposite to each other on the diagonal, one waste gas stream heating the forehearth. By use of dampers, the flow of waste gases from one exit to the other was roughly controlled. The flame length was approximately two meters before it impinged onto the surface of the glass bath.

A furnace of this construction was used in the manufacture of a glass having a very high melting temperature, the glass having to be maintained at a temperature in excess of 1400° C. The glass composition was a very special glass composition approximating to:
45% CaO
30% $SiO_2$
15% $Al_2O_3$
the balance being $Fe_2O_3$, $TiO_2$, a little alkali etc. Attempts to manufacture this special glass composition using an all electric furnace were not successful even through the batch raw materials used were extremely fine. However it was found that using a glass-melting furnace with the feeding and firing arrangement described above there was virtually complete fusion of the batch.

It is thought that in use of the above described furnace feeding and firing arrangement the batch/air stream surrounded by the fossil fuel mixed slowly during the passage down the cylinder and once free in the furnace the fuel, air and batch mixed strongly in an intense reaction resulting in the complete or almost complete fusion of the batch.

Observation of the glass surface in the furnace immediately below the central or feed area gives the impression that the glass is boiling when in fact molten glass droplets are raining down out of the flame on to the surface of the molten glass in the furnace.

It is found that in this process there is no evidence of unmelted batch provided that a sufficiently high temperature is maintained in the crown of the furnace. A crown temperature of 1550° C. was found to ensure that the glass batch was fully melted in the example given above. In this process molten glass falls through the flame and sticks to the surface of the molten glass in the furnace like glue.

It is important that a glass surface be maintained beneath the flame, so that carryover is kept to a minimum. It is further important to provide a sufficient length of path for the waste gases since, with waste gas exits at different distances from the flame center, a tendency was noted for there to be carryover at the nearer waste gas exit but no carryover at the further waste gas exit.

When melting only cullet with a particle size of minus 10 mms in the experimental furnace feeding and firing arrangement described, again the glass was molten before hitting the surface of the glass melt, and there was no evidence of unmelted material. It is therefore deduced that normal glass-making materials would be very satisfactorily melted by this method.

By calculation from data obtained on this experimental furnace, the energy utilisation for a normal glass composition will show a saving of about 40%, therefore less than 30 therms/tonne ($3.1 \times 10^9$ joules/tonne) must be achievable using the present invention and perhaps a melting rate in excess of 7 tonnes per square meter.

It is believed that, when incorporating the feeding and firing method of the present invention in a conventional furnace, the following additional changes should be made:
1) Considerable reduction in glass depth, achievable when the batch has fused and melted, prior to hitting the surface of the melt.
2) Considerable reduction in bath size, after the melting has taken place; what is required is time for homogenisation of refining. The glass after the burner is at a temperature far higher than that achieved on present melters. Therefore its viscosity will be lower, and this, together with the fact that most of the gases have been driven off previously, will speed up the refining processes. A reduced glass depth will be additionally beneficial, particularly for coloured glasses.

3) Since side or end ports will not be required, the crown may be significantly lowered leading to substantial energy saving benefits similar to those obtained by lowering the crown on forehearths. In fact after the burners, the remainder of the furnace will be heated or cooled by the waste gases when the present invention is adopted.

4) The exhaust ports for the waste gases will be placed at the throat end of the furnace and, since there is no reversal operation, there will again be an energy saving benefit. Heat recovery will be achieved in moving bed regenerators.

A moving bed regenerator would be smaller than a static system, it is far more efficient and gives real opportunities to clean up the emissions.

It is believed that, for a 300 tons (305 tonnes) per day melter, a cylinder 2.5 meters in diameter and 4.0 meters high would be required for confining the batch/air feed stream and the surrounding burning fuel. Most furnace walls would cope with such an obtrusion stuck on top of the furnace, particularly when the crown of the furnace would be lower anyway. However, in a preferred method according to the present invention, infra-sound is applied when the fuel is introduced, thereby reducing the cylinder height required. An infrasound level of the order of 140 decibels pulsing at 20 cycles per second would cause the fuel and air to oscillate relative to the powdered glass batch and so increase heat transfer to the glass batch that the batch achieves sufficient density within the flame that it falls out, i.e. as glass, or alternatively would force the batch onto the surface of the melt where judiciously placed bubblers would carry it away.

Additionally, the application of infra-sound with the introduction of fuel at the burners would create such thorough mixing of batch, combustion air and fuel, that the combustion air and fuel requirements would approach stoichiometric conditions.

The emission clean up is achieved at the moving bed regenerator by the following means:

1) Introduction of ammoniacal liquor approximately 22% $NH_3$ by volume at the entry to the top of the bed. Ammoniacal liquor, that is liquid ammonia, is preferred since it will expand rapidly and, because of the water present, will cool the waste gases and react quickly with the $NO_x$ and surplus oxygen.

Indeed, benefit may be achieved by introducing some ammoniacal liquor at the burner, since surplus oxygen would be mopped up in the intense reaction and carbon rich compounds would seize oxygen from any $NO_x$ around.

2) Simultaneously, lime water or caustic soda could be sprayed on to the top of the bed, thus extracting $SO_x$ as the waste gases move down the bed. Alternatively, two regenerators could be coupled, one for the $NO_x$ reaction, the second for the $SO_x$ reaction.

3) Particulates and condensates would be trapped on the balls of the moving bed regenerator.

4) The balls would be continuously removed at the regenerator base, tumbled to clean, and then returned to the regenerator top.

In use of the invention on a commercial glass-melting furnace the waste gas temperatures are expected to be less than 300° C.

BRIEF DESCRIPTION OF THE DRAWINGS

Reference will now be made to the accompanying diagrammatic drawings, in which.

DESCRIPTION OF THE PREFERRED EMBODIMENT

Figure 1:
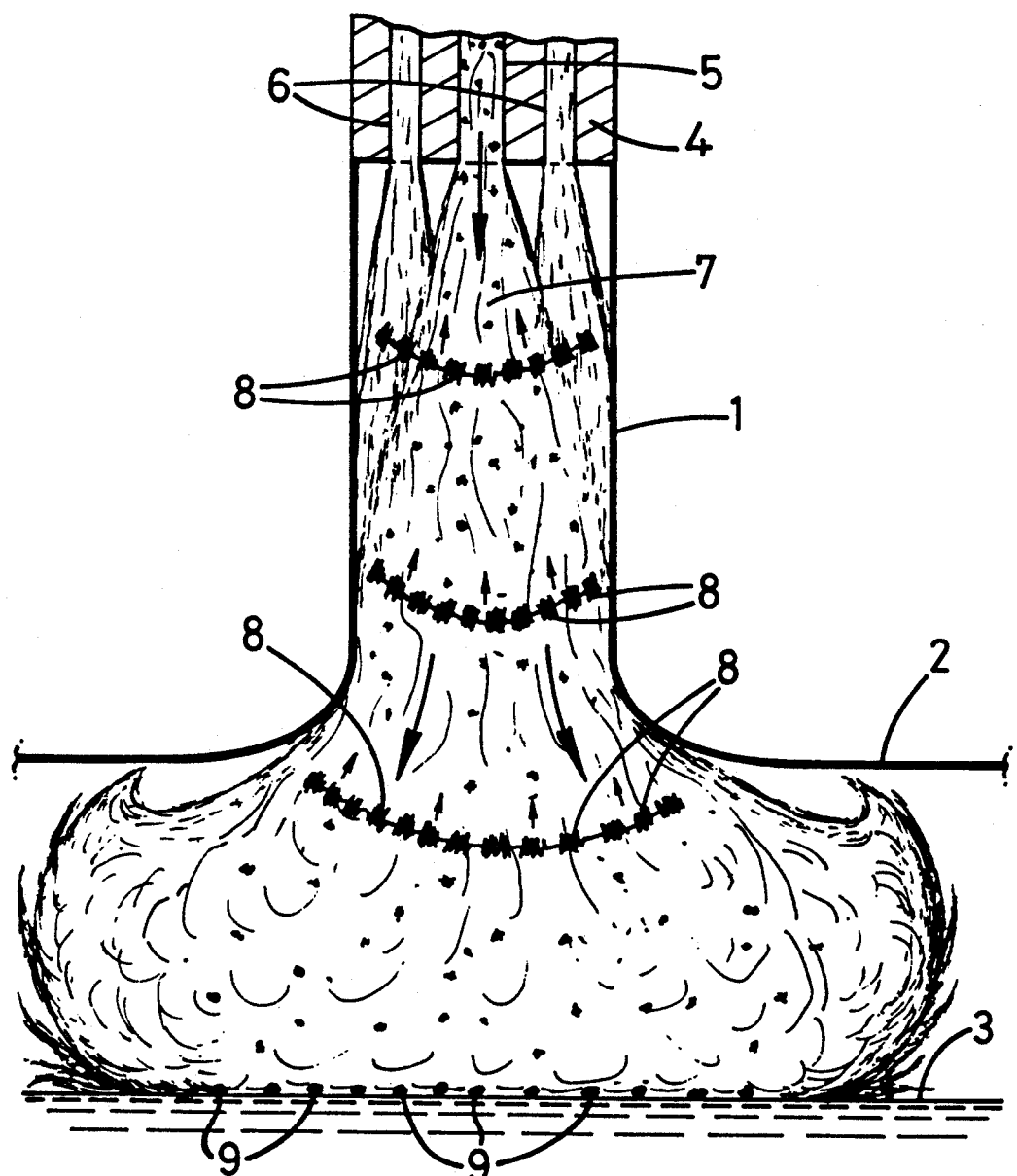
FIG. 1 is a side view of a preferred feeding and firing arrangement according to the present invention.

Referring to FIG. 1 there is shown a cylinder 1 which constitutes a tower extending upwardly from a crown 2 of a glass-melting furnace in which the surface of molten glass is denoted by reference 3. The upper end of cylinder 1 is closed by a lid 4 shown in cross-section to contain a central hole 5 and holes 6, on either side of the central hole 5. The holes 6 are two of six holes arranged in a ring about the central hole 5.

Glass batch and secondary air are passed in a single feed stream 7 through the central hole 5. Fossil fuel, gas or oil, is passed through burners (not shown) at the holes 6, so that flame passes down the cylinder 1 all around the single feed stream which gradually expands into the surrounding flame.

After being substantially confined in the cylinder 1, the single feed stream 7 is able to expand when it passes out of the cylinder 1 into the furnace below the crown 2. The flame surrounding the single feed stream 7 hits the surface 3 of molten glass in the furnace and spreads out in all directions within the furnace.

Advantageously infra-sound waves such as are used in firing some power stations, are employed in the combustion system, the infra-sound being applied at the holes 6. As the infra-sound waves are reflected from the surface 3 of the molten glass, vertical vibrations are set up in the flame as indicated diagrammatically at 8 in FIG. 1, and the relative movement which is caused between the particles of glass batch and the hot air and burning fuel results in increased mixing and rapid transfer of heat to the glass batch so that complete melting of the batch is ensured.

When the batch melts and glass droplets are formed, these drop out of the flame onto the surface 3 of the molten glass as indicated by droplets 9.

Figure 2:
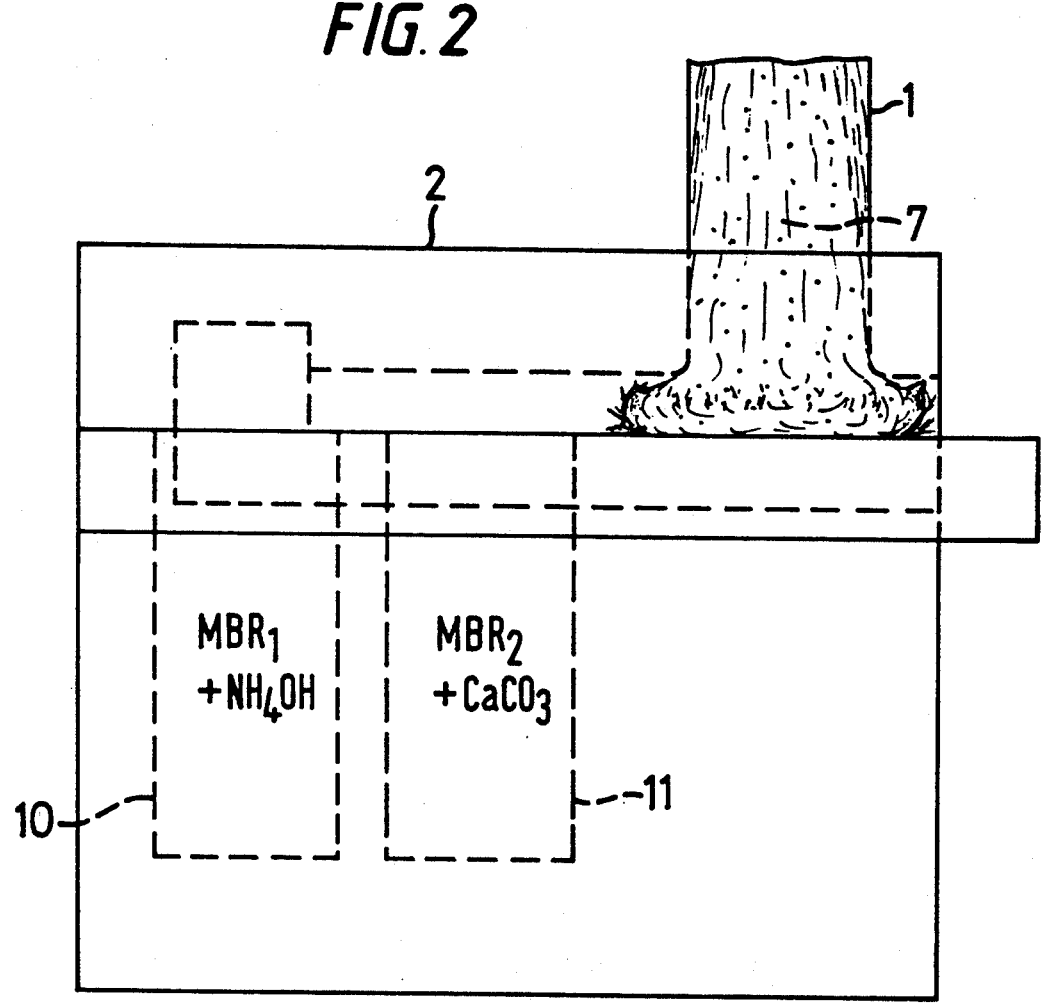
FIG. 2 is a side view showing the arrangement of moving bed regenerators for heat recovery and cleaning the exhaust gases in relation to the feeding and firing arrangement of FIG. 1.
Figure 3:
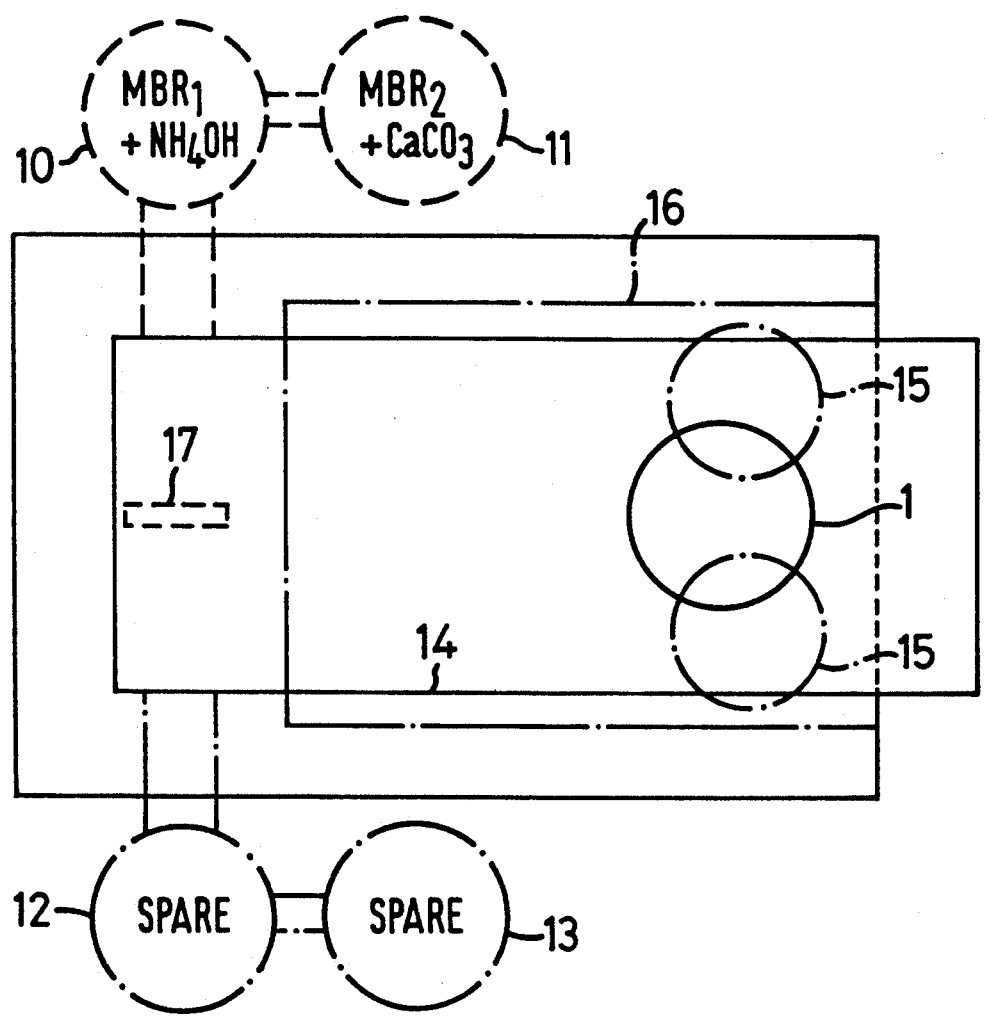
FIG. 3 is a plan view of the arrangement of FIG. 2, showing the siting of spare moving bed regenerators and a double feed alternative to the single feed and firing arrangement.

FIGS. 2 and 3 show the arrangement of moving bed regenerators $MBR_1$ and $MBR_2$, also designated by numerals 10 and 11, for cleaning the exhaust gases to remove $NO_x$ and $SO_x$ respectively. The moving bed regenerators are each essentially similar to the pebble heater described by S. L. Norton, Jr. in the Journal of the American Ceramic Society Vol. 29, No. 7 at page 188. Spare moving bed regenerators are indicated at 12 and 13 for use when regenerators 10 and 11 are out of service.

In FIG. 3 the outline of the molten bath is indicated at 14 in relation to the cylinder 1.

As an alternative to use of a single feed cylinder 1, a pair of cylinders 15, 15 may be used, in which case a wider bath is required as denoted by the dashed line 16.

A throat 17 is shown in the molten bath 14, the molten glass being fed through the throat 17 to a forehearth (not shown) after which the molten glass may be refined and preconditioned in steps which form no part of the present invention.

By the use of the present invention the melting of a glass batch may be accomplished in a smaller furnace than that conventionally used for the same throughput of material. Because the furnace is smaller, less energy is required to heat it, and there is consequently less pollution from exhaust gases to atmosphere.

We claim:

1. A method of feeding and firing a glass-melting furnace in which a feed stream comprising glass batch and combustion air is moved downwardly above the crown of the furnace, characterised in that the downwardly moving feed stream is surrounded by downwardly moving burning fuel, the feed stream and burning fuel are confined in a cylinder prior to entry into the furnace through the furnace crown, the glass batch is passed generally vertically and downwardly through the cylinder, the batch in the feed stream is heated to melting temperature, molten glass droplets fall upon the surface of molten glass in the furnace, and a mixture of heated glass batch, combustion air and burning fuel is passed through the crown of the furnace.

2. A method according to claim 1 characterised in that heat transfer to the batch in the feed stream is enhanced by the application of infra-sound.

3. A method of feeding and firing a glass-melting furnace in which a feed stream comprising glass batch and combustion air is passed downwardly through a tower above the crown of the furnace, characterised in that fuel is introduced and burned in the tower to heat the glass batch, infra-sound waves are also applied within the tower to enhance transfer of heat from the burning fuel to the glass batch, and a mixture of heated glass batch, combustion air and burning fuel is passed downwardly from the tower through the crown of the furnace.

4. A method according to claim 3 characterised in that droplets of molten glass fall from the said mixture onto the surface of molten glass in the furnace.

5. A method according to any one of the preceding claims characterised in that the glass batch, combustion air and burning fuel are passed vertically downwardly through the crown of the furnace, and the flame of burning fuel strikes the surface of molten glass in the furnace.

6. A method according to claim 5 characterised in that the flame spreads out in all directions within the furnace.

* * * * *